Aug. 23, 1966  A. A. GOPPERTON  3,267,846
CHECK AND SIGNATURE PRINTING MACHINE
Original Filed Aug. 14, 1964  6 Sheets-Sheet 1

Fig. 1.

Inventor.
Ardath A. Gopperton,
By Brown, Jackson,
Boettcher & Dienner
Attys.

Aug. 23, 1966    A. A. GOPPERTON    3,267,846
CHECK AND SIGNATURE PRINTING MACHINE
Original Filed Aug. 14, 1964    6 Sheets-Sheet 2

Inventor:-
Ardath A. Gopperton,
By Brown, Jackson,
Boettcher and Dienner
Attys

Fig. 4.

INVENTOR.
Ardath A. Gopperton.

Aug. 23, 1966

A. A. GOPPERTON 3,267,846

CHECK AND SIGNATURE PRINTING MACHINE

Original Filed Aug. 14, 1964

INVENTOR.
Ardath A. Gopperton,
BY

Attys

United States Patent Office 3,267,846
Patented August 23, 1966

3,267,846
CHECK AND SIGNATURE PRINTING MACHINE
Ardath A. Gopperton, Mount Prospect, Ill., assignor to Theodore B. Hirschberg, Jr., Chicago, Ill.
Original application Aug. 14, 1964, Ser. No. 389,583, now Patent No. 3,241,481, dated Mar. 22, 1966. Divided and this application Jan. 21, 1966, Ser. No. 513,650
4 Claims. (Cl. 101—96)

This application is a division of my copending application, Serial No. 389,583, filed August 14, 1964, for Check and Signature Printing Machine, now Patent No. 3,241,481.

This invention relates to machines for printing checks and similar instruments, frequently termed check writers.

In many known check writers the amount only of the check is printed and the signature is later affixed. It is also known to provide check writers which print both the amount of the check and the signature thereto. Such machines may be used for printing the amount of a check only or for printing both the amount and the signature, but are not suitable for use as signature printing machines only. Accordingly, where it is desired to print only the signature on a check blank, a separate signature printing machine is required.

My invention is directed to a machine which may be used for printing either the amount only of a check or the amount of the check and the signature, and may also be used for printing a signature only on a check blank, thus avoiding necessity for a separate signature printing machine. To that end, I provide means whereby the printing segments or elements of the machine may be adjusted to a non-printing position and omit printing characters on fixed parts of the machine, usually present in the known check writers, so that in the printing operation the signature only is printed on the check blank. I also provide means whereby insertion of the signature plate into the machine assures operation of a counter and removal of the plate prevents operation of the counter, so that an accurate record may be kept of the number of signed checks and check blanks printed. Additionally, I provide means whereby the pressure exerted by the platen means during the printing operation may be adjusted to suit conditions so as to avoid excessive pressure when the machine is used as a signature printing machine only. A further novel feature of the machine of my invention is the provision of means guarding against overthrow of certain of the printing segments incident to a clearing operation subsequent to printing of a check. Further objects and advantages of my invention will appear from the detail description.

The check writing machine of my instant invention is, in general, similar to the machine disclosed in Patent No. 2,826,140, issued March 11, 1958, to Hubert Jagger, and is also similar to the machine disclosed in my patent for Signature Printing Checkwriter, No. 3,142,251, issued July 28, 1964, and a brief description of the general construction and operation of the machine will suffice.

The main frame of the machine comprises right and left side plates 1 and 2 of irregular polygonal shape, each provided with a forwardly extending base portion 3 which defines, with the body portion of the plate, a rearwardly extending slot 4 for the insertion of the check blank or like paper into the machine. The plates 1 and 2 are secured together in spaced relation by cross rods 5 suitably secured therethrough.

A shaft 6 is suitably mounted in the plates 1 and 2 and extends through a sleeve 7 at the upper end of a "sum" post 8 disposed at the inner face of the side plate 1 and secured at its lower end to a slotted guide bar 9 which extends transversely to the main frame and has its end portions suitably secured in the plates 1 and 2. The shaft 6 also passes through a sleeve 10 at the upper end of a signature plate post 11 disposed adjacent the inner face of the side plate 2 with its lower end anchored to the guide bar 9. The sum post 8 is of T-cross section at its lower end for reception of a prefix plate 12 of channel cross section slidable thereon. The prefix plate or sum bar, as it is frequently termed, bears a suitable legend upon its printing face, such as "The Sum" and also bears a dollar mark. Suitable means, referred to more fully later, is provided for actuating the prefix plate 12. It should be noted that the "Dollars" and "Cents" bars or posts of my above identified application have been omitted, for reasons to be explained more fully later.

A plurality of type segments, comprising five dollar segments 13 and 14, a cent segment 15 and a second cent segment 16 are mounted on shaft 6 for turning movement thereon, these segments being suitably spaced apart by spacing collars 17. Each of the dollar segments 13 and 14 is provided with an arcuate type bar having upon its printing face a series of characters ranging from "0" to "9" and arranged in seriatim order. The second cent segment is provided with a type bar having upon its printing face characters ranging from "0" to "9," such characters being smaller than those of the type bars of the dollar segments and being each disposed immediately above a short underscoring cross bar, as shown more clearly in FIGURE 8. The type bar of the second cent segment 16 is further provided, in alignment with each of the printing characters thereof, with the abbreviation for cent. The type bar of the first cent segment 15 is similar to that of segment 16, except that the abbreviation for cent is omitted and the type bar is, accordingly, of less width than that of segment 16. As above noted, the guide bar 9 is slotted and the slots thereof receive the type bars of the printing segments effective for guiding the latter in the movement thereof and holding them against lateral looseness or play. In the printing operation the characters of the segments which are to be used are disposed in alignment immediately in the front of the forward edge of the guide bar 9, which determines the printing line of the machine.

Each printing segment is provided with a forwardly projecting finger 20 riveted or otherwise suitably secured thereto and appropriately shaped and disposed to project through a slot in an index plate of an enclosing housing (not shown), as is known, such housing or casing having a base portion 21 suitably secured, conveniently by screws, to the side plates 1 and 2 in underlying relation thereto. A number strip 22 is suitably secured to finger 20 at the underface of the index plate (not shown). The finger 20 is provided at its outer end with a finger grip 23 fitting thereon with a tight friction fit so as to be removable if required. The strip 22 is numbered correspondingly to the associated printing segment and the strips 22 are so disposed that the number of a strip observable through an opening in the index plate indicates that the same number of the corresponding printing segment is disposed on the printing line of the machine; as is known.

As will be understood from what has been said, the printing segments are independently adjustable about the shaft 6. Each of the segments 13 is provided with a two-way rack 27 formed by cutting teeth in the hub portion of the segment. Each of the segments 14, 15 and 16 also is provided with a two way rack 27a extending rearward a slightly greater distance than the racks 27, for a purpose to be explained later. An index bar 28 is suitably secured at its ends in the plates 1 and 2 and is disposed in rear of and above shaft 6. Bar 28 is slotted for reception of the racks of the respective segments and is provided with spring pressed ball detents which cooperate with the racks for holding the respective segments yieldingly in adjustment, as is known. A clearing yoke 29 of substantially inverted U-shape is mounted for turning movement upon the shaft 6 and straddles the printing segments. The yoke 29 is yieldingly held in a rearward position and upon completion of a printing operation may be swung forward and downward effective for returning to normal position such segments as may have been moved therefrom. Means is provided for rendering the clearing yoke ineffective when it is desired to print a number of checks for the same amount, or to print a signature only on check blanks. The latter means, as well as the means for operating yoke 29 to effect a clearing operation, are disclosed in my above identified application and need not be described herein greater detail.

The operating means for effecting a printing operation is similar to that of my above-identified application and a brief description thereof will suffice. A cam 32, rotatably mounted on side frame plate 2, is turnable in opposite directions to limited extent by an operating lever 33 provided with a suitable handle 34. Clockwise turning of cam 32 is limited by a stud 35 secured to plate 2. A link 36 is pivoted at its forward end, at 37, to cam 32 and is pivoted at its rearward end to pintle 38 of toggle means 39 for operating inner and outer pairs of platen arms 40 and 41 rockably mounted on a shaft mounted at its ends in the base portions 3 of plates 1 and 2. A platen support bar 43, mounted between arms 40 at the forward ends thereof, carries a serrated scarifying platen 44. Platen support bar 45, mounted between the forward ends of arms 41, carries a serrated platen 46 and a platen 47. The platen 44 is disposed to scarify the payee area of the check and platen 46 is disposed to scarify the amount or sum area of the check. Means is provided whereby the platen 44 may be rendered effective and ineffective, as desired, such means being known and not requiring detailed description here.

In performing a printing operation, assuming the printing segments to be properly adjusted, the operating lever 33 is swung forwardly and downwardly thereby extending the toggle means 39 and moving the platens 44, 46 and 47 upwardly into pressure contact with the corresponding cooperating members. When the machine is used for printing checks, including the amount for which the check is drawn, either with or without the printed signature, movement of the lever 33 downward and forward is limited by contact of the forward end of link 36 with a stud 50 secured to side plate 2. It is desirable that the lever 33 be moved to its maximum permissible extent in effecting the printing operation. To that end the cam 32 has associated therewith a segment or rack 51 cooperating with a pawl 52 pivoted on side plate 2 and held by a tension spring in position to engage rack 51 and thereby assure full throw of lever 33. Full throw means of the character shown is known and need not be described in greater detail. Upon completion of the printing operation the toggle means 39 is returned to its normal condition, by a tension spring 53 anchored to pintle 38 and to plate 2. In the return movement of the operating lever 33 the clearing yoke 29, if effective, is actuated and returns the printing segments to normal position, in which the segments 13 are disposed in a non-printing position and the segments 14, 15 and 16 are in a zero printing position, for reasons explained more fully presently.

The type bar of each of the printing segments 13 is provided with a notch 56 in its rear lower portion and each of the type bars of the segments 14, 15 and 16 is provided with a similar notch 57. When the printing segments are returned to normal position by the clearing yoke or bail, the notches 56 of the type bars of segments 13 are disposed on the printing line of the machine in front of guide bar 9 and in alignment with each other and with the prefix plate or sum bar 12. The printing segments 14, 15 and 16 are then disposed in zero printing position with their zero printing characters disposed on the printing line of the machine. In that connection, the clearing yoke 29 is provided with a cutout or notch 58 in the right end portion thereof, as viewed from in front, of such depth that in the clearing operation the segments 14, 15 and 16 are returned to zero printing position and the other segments 13 are returned to non-printing position, as above noted.

The prefix plate or sum bar 12 is held on the lower end of post 8 by a latch lever 59 pivoted at 60 to the lower end of a swing arm 61 fixed at its upper end on the forward end of a pivot pin 62 extending through post 8. A tension spring 63, anchored at its upper end to a finger 64 of arm 61 and at its lower end to latch lever 59 inward of pivot 60, at 65, holds the outer hook portion of latch lever 59 in engagement with a stud 66 projecting from the sum plate 12, when the latter is mounted on post 8. A second tension spring 67, of materially greater strength than spring 63, is anchored at its lower end to finger 64 and at its upper end to an upward projection 68 of post 8. An arm 69, fixed on the rearward end of pivot pin 62, is provided with a pin overlying arm 70 of a lever 71 pivoted on a stud 72 fixed to side frame plate 1. In the normal non-extended condition of the toggle means 39, arm 70 of lever 71 cooperates with arm 69 for holding the sum bar 12 in its outer position, in opposition to tension spring 67. As the toggle means 39 is extended, during a printing operation, arm 69 is released for downward movement and tension spring 67 then becomes effective for swinging arm 61 in counterclockwise direction, as viewed from in front, effective for moving the sum bar 12 inward into contact with the nearest one of the printing segments which may be in printing position. Assuming the printing segments to be in their normal positions, the sum bar 12 will be moved inwardly into contact with the segment 14, which is then in zero printing position. Under such conditions, the machine would print in the sum area of the check three zeros immediately preceded by "The Sum" and a dollar mark the first zero being larger than the second and third zeros.

Ordinarily, however, one or more of the printing segments 13 would be moved to printing position and the sum bar would be moved inwardly into contact with the nearest one of such segments. Upon return of the operating lever 33 to normal position, after completion of a printing operation, the sum bar 12 is returned to its normal outer position. The means for operating the sum bar is similar to that disclosed in the Rindefleisch Patent No. 2,697,987 and need not be described herein greater detail.

Figure 11:
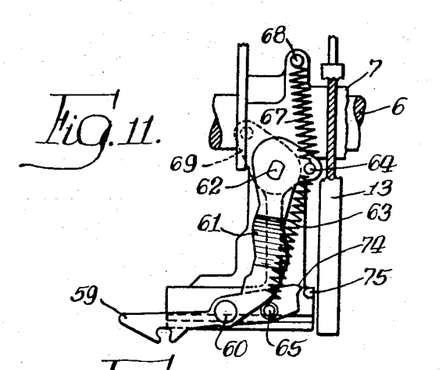
FIGURE 11 is a front view of the sum bar latch lever and associated parts in their normal positions, with the sum bar and all but the first printing segment omitted and certain parts broken away.
Figure 12:
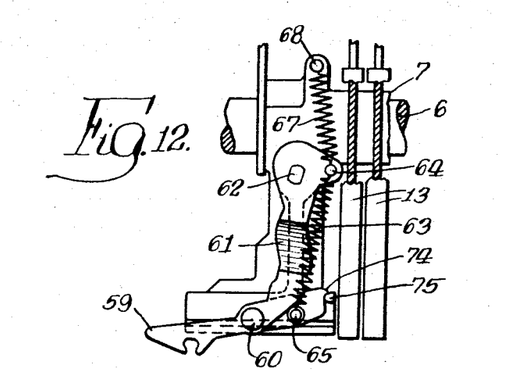
FIGURE 12 is a view similar to FIGURE 11 but showing the position of the sum bar latch lever during a printing operation.

Referring particularly to FIGURES 11 and 12, it will be noted that the latch lever 59 is provided at its upper inner corner with an inwardly projecting point or tooth 74 which, in the normal outer position of sum bar 12, is spaced outwardly a short distance from a stud 75 projecting forwardly from the upper inner corner of the base of post 8. When the sum bar 12 is in position on post 8, the tooth 74 is disposed to pass beneath stud 75, latch lever 59 being then held with its outer end raised by stud 66, as in FIGURE 3. When the sum bar 12 is removed, as is done when the machine is used for printing signatures only, the inner end of latch lever 59 is raised by tension spring 63 into its position shown in FIGURE 11. At the start of a printing operation, the latch bar moves inward a slight distance into contact with stud 75 and is held thereby against further inward movement, for a purpose to be described presently.

The machine is provided with an inking ribbon 78 windable onto and off of rearward and forward spools 79 and 80 and passing beneath guide bar 9 and the printing segments, above a shield or guide member 81 pivoted at 82 between the side plates 1 and 2. The shield 81 is provided with a forward extension 83 the under surface of which is serrated and cooperates with the platen 44 for scarifying the payee area of the check, when desired, suitable known means being provided for rendering the platen 44 effective and ineffective, as desired. The means for feeding the ribbon 78 onto and off of the spools 79 and 80 is the same as that disclosed in the Jagger Patent 2,826,140 and need not be described more fully here, it sufficing to state that any suitable means may be provided for that purpose. I also provide means for providing slack in the ribbon and guarding against smudging of the check during the printing operation, such means preferably being the same as that disclosed in my above identified copending application. It need not be described in detail here, and any suitable means for that purpose may be provided.

As previously noted, when the printing segments are in normal position the segments 13 are disposed in non-printing position, with the notches thereof being aligned with the sum bar, and the segments 14, 15 and 16 are disposed in zero printing position with the zero characters thereof on the printing line of the machine and aligned with the sum bar 12. It is desirable that in the clearing operation the segments 14, 15 and 16 be restrained against movement beyond zero position, to guard against possibility of a blank area at the corresponding portion of a printed check. To guard against that, I provide means actuated by the clearing yoke and effective for preventing turning movement of the segments 14, 15 and 16 beyond zero printing position in the clearing operation.

Figure 1:
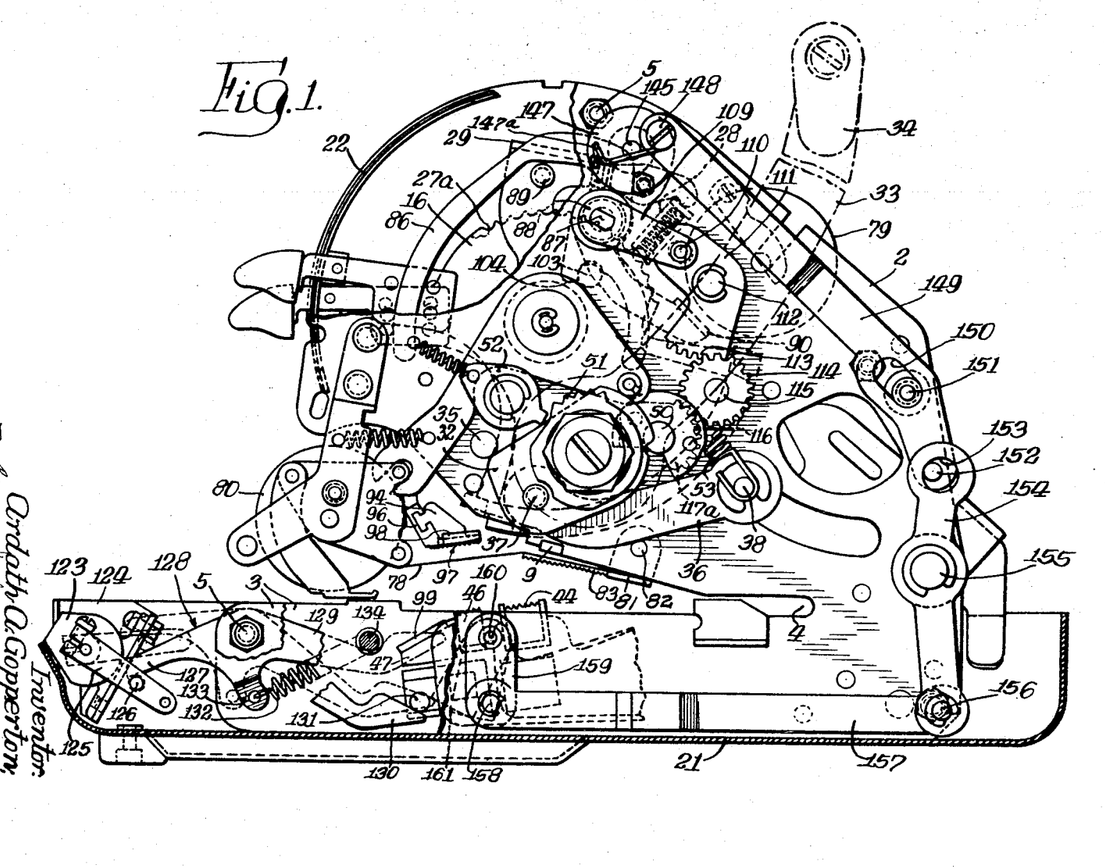
FIGURE 1 is a side view of a check and signature printing machine embodying my invention, the upper section of the housing being omitted and the base section of the housing being broken away, for clearness of illustration.
Figure 2:
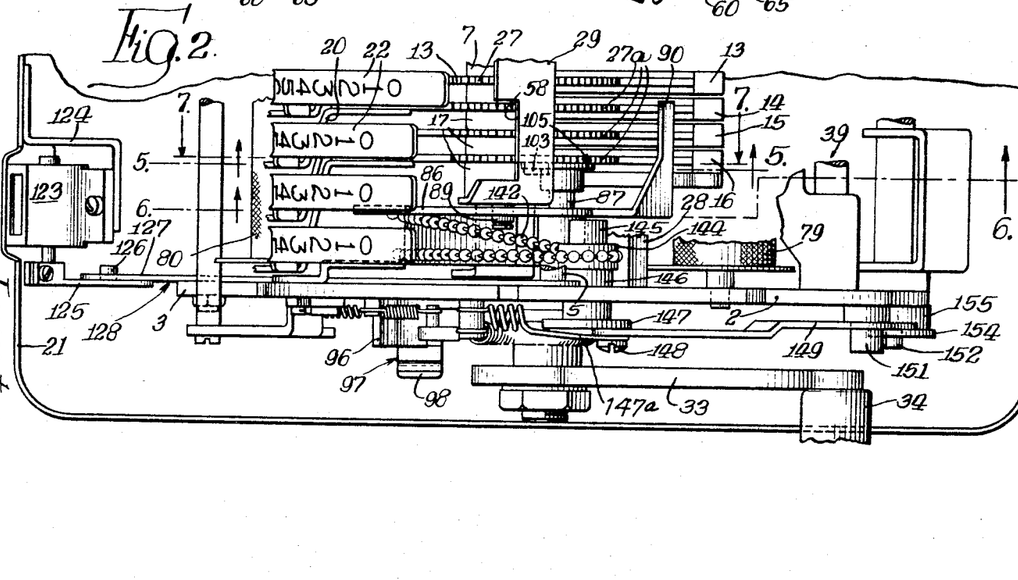
FIGURE 2 is a fragmentary top plan view of the machine of FIGURE 1, with certain parts broken away.
Figures 5, 7, 8, 9, 10:
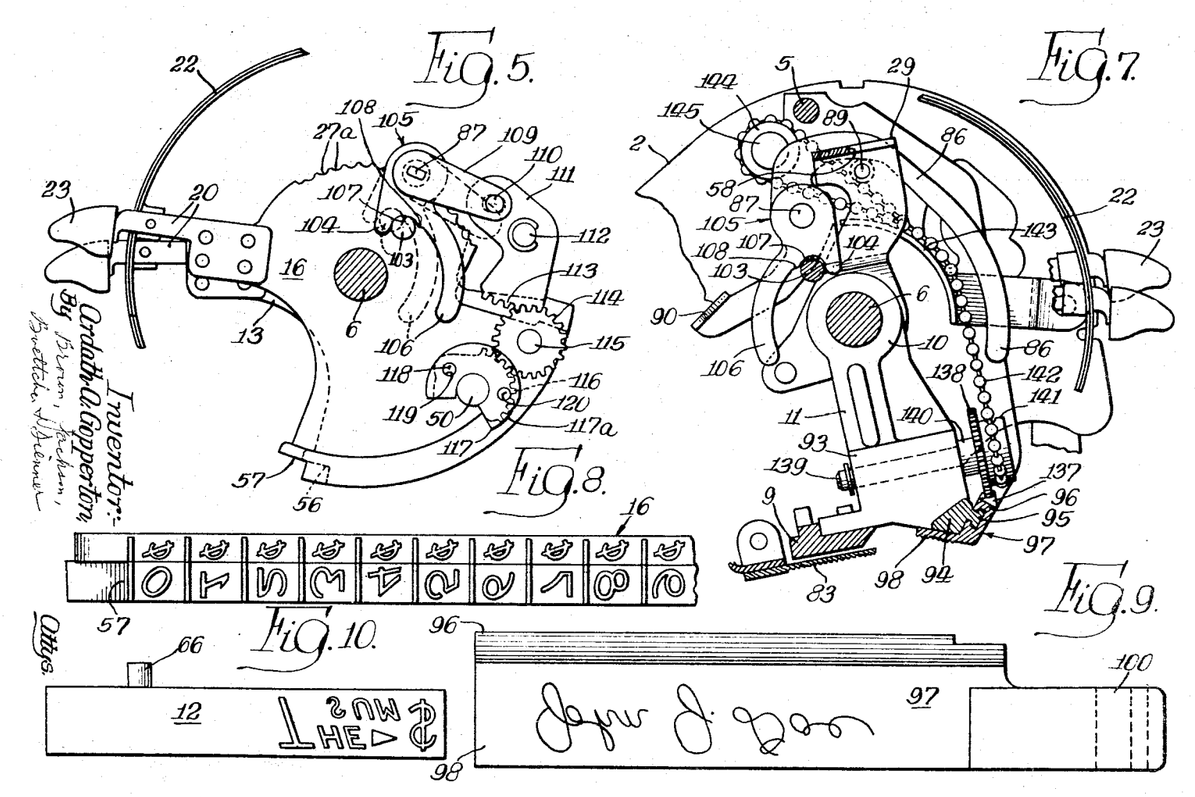
FIGURE 5 is a fragmentary sectional view taken substantially on line 5—5 of FIGURE 2, with certain parts omitted and certain other parts at the outer face of the right hand frame plate shown in elevation.
FIGURE 7 is a fragmentary sectional view taken substantially on line 7—7 of FIGURE 2.
FIGURE 8 is a face view, on an enlarged scale, of the second cent printing segment.
FIGURE 9 is a face view, on an enlarged scale, of the signature plate.
FIGURE 10 is a face view, on an enlarged scale, of the prefix plate or sum bar.
Figure 6:
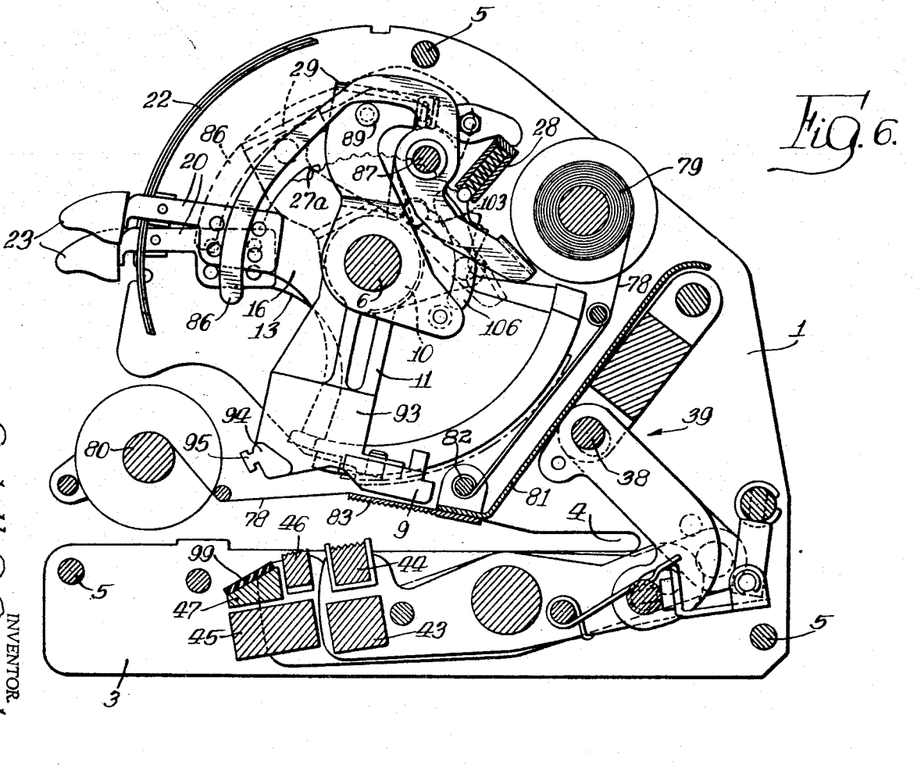
FIGURE 6 is a sectional view taken substantially on line 6—6 of FIGURE 2.

Referring to FIGURES 1, 2 and 7 a cam lever 86 is rockably mounted on a stub shaft 87 rotatably mounted in a bushing 88 secured in side frame plate 2. The cam lever 86 is disposed adjacent the right hand end of the clearing yoke and overlies a stud 89 secured to that end of the yoke. The lever 86 extends rearward beyond stub shaft 87 and is provided at its rearward end with a locking finger 90 which overlies the rearward portions of the printing segments 14, 15 and 16. In the normal position of yoke 29 cam lever 86 is so disposed that finger 90 thereof is spaced above the rearward portions of segments 14, 15 and 16 a sufficient distance to permit of those segments being turned from zero printing position to a non-printing position, as will appear more fully later.

When the yoke 29 is swung downward and forward, in a clearing operation, cam lever 86 is turned counterclockwise, as viewed in FIGURE 7, by the stud 89, effective for moving the locking finger 90 downward to a position such that the rearward edge portions of segments 14, 15 and 16 will contact finger 90 when those segments are turned from a printing position other than zero to zero position. That occurs shortly before yoke 29 reaches the limit of its clearing movement and the finger 90 is then effective for preventing overthrow or turning of the segments 14, 15 and 16 beyond zero position. Upon completion of the clearing operation the yoke 29 is released and is returned to its normal position thereby returning the cam lever 86 to its normal position. The segments 14, 15 and 16 may then be turned from zero printing position to non-printing position for use of the machine for signature printing purposes only, as will be explained more fully later. The segments 14, 15 and 16 may be turned from zero position to any higher printing position regardless of the position of the cam lever 86, the primary function of which is to prevent turning of those segments beyond zero position in the clearing operation. That assures that all of the printing segments are returned to normal position upon completion of the printing operation, thus avoiding possible confusion in setting of the segments such as might occur if any one of the last three segments 14, 15 and 16 were turned to non-printing position in the clearing operation.

Figure 3:
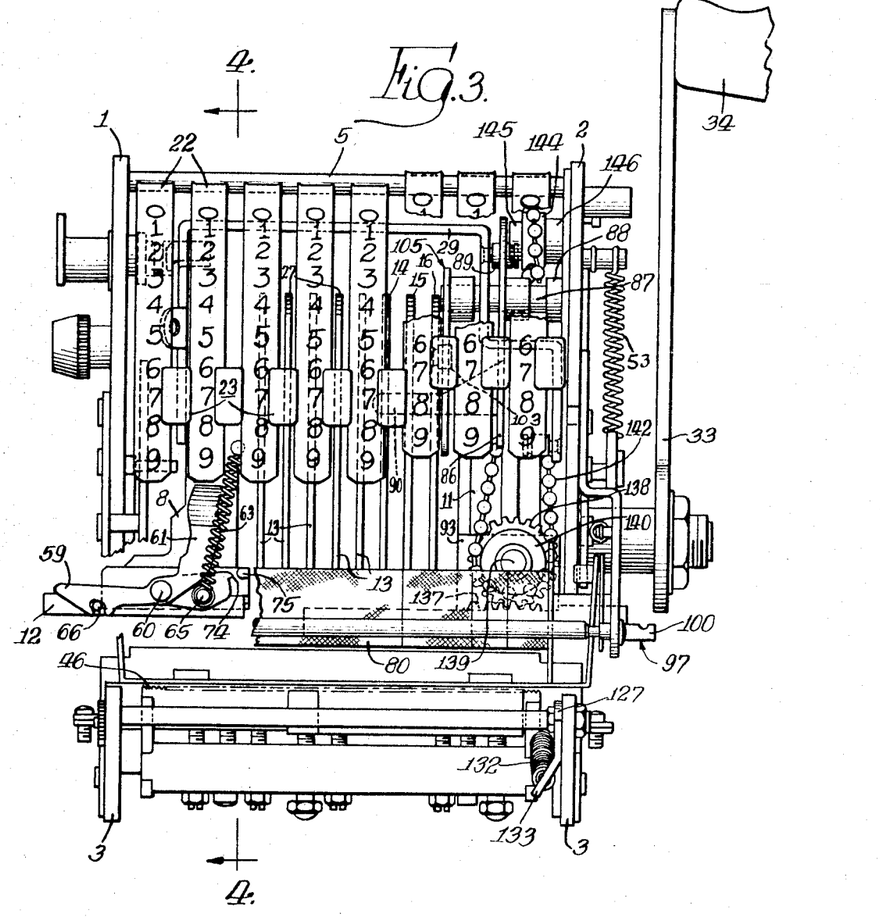
FIGURE 3 is a front view of the machine of FIGURE 1 with certain parts broken away and other parts shown in section.
Figure 4:
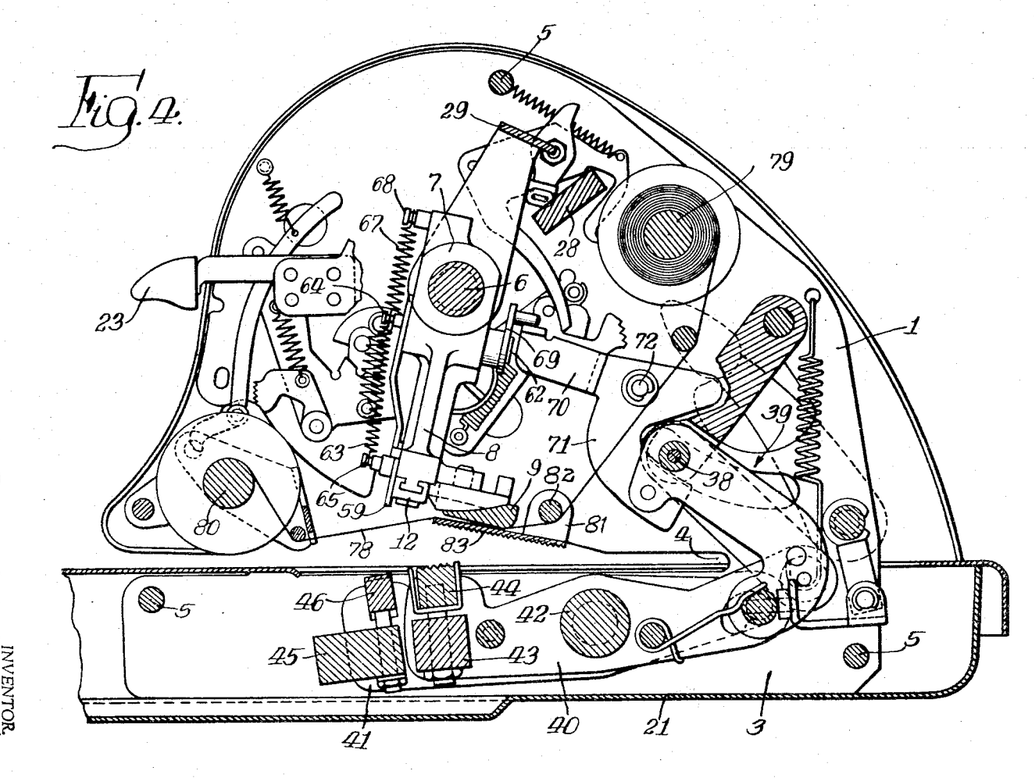
FIGURE 4 is a sectional view taken substantially on line 4—4 of FIGURE 3, with certain parts broken away.

Referring to FIGURES 1, 3 and 7, the signature plate post 11 is provided at its lower end with thickened hub portion 93 which extends forwardly beyond the printing line area of the machine. Hub portion 93 is provided, at its lower forward corner, with a support 94 extending parallel with the printing line of the machine and spaced forwardly therefrom a distance corresponding to the distance between the sum or amount area of a check and the signature area of the check. The support 94 is provided at the front thereof with a lengthwise rib 95 of substantially T-shape in cross section. The rib 95 fits snugly in a corresponding slot and grooves in the forward arm 96 of a signature plate 97 of substantially flattened V-shape in cross section. The other arm 98 of plate 97 bears on its underface a signature, such as shown in FIGURE 9, and is serrated for cooperation with the signature platen 47, preferably provided on its upper face with a cushion or pad 99 of rubber or other suitable material. As will be understood, the signature plate 97, when positioned in the machine, is suitably disposed for cooperation with the platen 47.

The side frame plate 2 is provided with a suitable opening for insertion and removal of the signature plate, as is the upper section of the casing or housing, as will be understood. Arm 98 of the signature plate is provided with a finger or extension 100 to facilitate insertion and removal of the signature plate. I also provide means whereby the signature plate may be locked in position in the machine or whereby insertion of the signature plate into the machine may be prevented. Any suitable means may be provided for that purpose though I preferably provide the means disclosed in my above identified copending application, which means need not be described in detail here. When the signature plate is in position in the machine, checks for any desired amount, within limits, may be printed with the signature also printed on such checks. By removing the signature plate the machine may be used for printing checks in desired amounts without a printed signature, the signature being later affixed in a suitable manner, by pen and ink or otherwise.

When it is desired to print the signature only on check blanks, the clearing yoke is disabled by suitable known means, preferably the means disclosed in my above identified copending application. With the signature plate properly positioned in the machine and the clearing yoke disabled, the printing segments 13 are turned to non-printing position, if not already in such position, the segments 14, 15 and 16 are also turned to non-printing position and the sum bar or prefix plate 12 is removed. When printing segment 16 is in zero position a stud 103, projecting from the outer side of that segment, is disposed in contact with a forward finger 104 of a lever 105 fixed on the inner end of stub shaft 87 and having an arcuate arm 106 joined to finger 104 by an arcuate recess 107 providing a slight shoulder 108 at the upper end of arm 106. If the segment 16 is turned from its zero position to a higher printing position stud 103 turns lever 105 slightly in counterclockwise direction as viewed in FIGURE 5, and thereafter segment 16 may be turned to any desired printing position above its zero position without affecting lever 106.

When it is desired to print the signature only on check blanks, the segments 13 remain in their normal non-printing position and the segments 14, 15 and 16 are turned to their non-printing positions, as above noted. When segment 16 is turned to non-printing position stud 103 turns lever 105 in clockwise direction thereby turning the stub shaft 87 in the same direction. An arm 109 is fixed at its forward end to the outer end of stub shaft 87 and is pivoted at its rearward end, at 110 to the upper arm of an angle lever 111 pivoted on a stud 112 fixed to frame plate 2 at the outer side thereof. The angle lever 111 is provided at its lower end with a rack 113 meshing with a spur pinion 114 rotatably mounted on a stud 115 secured to side frame plate 2. The pinion 114 meshes with a segmental gear 116 mounted for turning movement on the stud 50. An interrupted or segmental disk or washer 117 is mounted on stud 50 at the outer face of gear 116. The latter is provided with a stud 118 which extends through one of two openings 119 and 120 in the washer 117. The washer 117 is of slightly reduced radius for a portion of its periphery, at 117a, as shown in FIGURE 1. The washer 117 is of somewhat greater radius than the segmental gear 116 and extends across the outer face of pinion 114 and the cam 32 extends across the outer face of washer 117 effective for restraining the latter against outward movement on stud 50, the washer 117 being effective for restraining the pinion 114 against outward movement on stud 115. The opening in the segmental gear 116 is disposed in registry with the opening in the washer 117 and when the segment 116 is in zero printing position the stud 50 is exposed at the openings of the gear 116 and washer 117. Accordingly, the operating lever 33 may be swung downwardly and forwardly to its full extent, until the forward end of link 36 contacts stud 50, for exerting maximum pressure when printing a check for a desired amount, either with or without the printed signature, as previously described.

When printing a check blank with the signature only, the pressure exerted during the printing operation preferably should be reduced to avoid unbalanced pressure and to assure a clear impression of the signature. When the printing segment 16 is moved from its zero position to its non-printing position the segmental gear 116 and washer 117 are turned in counterclockwise direction, as above described, to such position that the end of link 36 contacts the washer as the operating lever 33 approaches the limit of its downward and forward movement. That limits the stroke of lever 33, effective for limiting the pressure exerted by the signature plate platen 47 as and for the purpose above stated. During the signature printing operation all of the printing segments are in non-printing position and the notches of the segments 14, 15 and 16 are disposed a slight distance rearward of the notches of the other segments to guard against possible marking of the check adjacent the signature area. By reversing the position of the washer 117 from that shown in FIGURE 1, the portion 117a thereof of reduced radius is disposed for contact by the forward end of link 36 thereby permitting a slightly longer stroke of the operating lever 33 than is possible with the washer in its full line position shown in FIGURE 1. In that manner, the pressure exerted during the signature printing operation may be adjusted to a certain extent as may be required. Also, during the signature printing operation the sum bar or prefix plate 12 is removed. The latch lever 59 is then held against inward movement, as previously described and as shown in FIGURE 12, thereby holding the outer end portion thereof against downward movement. That guards against marking of the face of the check such as could be occasioned by upward movement of the slack of the ribbon with the check blank during the signature printing operation. If the latch lever 59 were free to move inwardly along the printing line of the machine during a signature printing operation, the hooked outer end thereof would drag across the upper face of the ribbon 78, the slack of which would be raised by the check blank, thereby causing an objectionable mark or line across the face of the check blank.

As above noted, when the machine is used for printing signatures only on check blanks all of the printing segments are disposed in non-printing position. Further, the clearing yoke is rendered inoperable, by known means above mentioned, and is then in a position disposed slightly rearward of its normal operable position, thereby assuring that the printing segments 14, 15 and 16 may be moved to non-printing position and, with the other segments 13, will remain in such position during use of the machine for printing signatures only.

It is desirable, and frequently important, that an accurate record be kept of all checks and check blanks bearing a printed signature. To that end I provide a counter 123 mounted on a bracket 124 secured to the front wall of base 21 of the housing. Counter 123 is of conventional type and is provided with a rearwardly extending actuating arm 125 having a pin 126 underlying the forward arm 127 of an operating lever 128 pivoted on a cross rod 5. The rearwardly extending arm 129 of lever 128 is provided, at its rearward end, with a foot 130 which underlies a stud 131 projecting from the adjacent end of the signature plate platen support bar 45. A tension spring 132 is anchored at its forward end to a downwardly extending finger 133 of lever 128 and at its rearward end to a cross shaft 134 rotatably mounted in the base portions 3 of the side plates 1 and 2. The cross shaft 134 is included in adjustable check stop means of conventional type for limiting the extent of insertion of a check blank into the machine. Such check stop means is well known and need not be described here.

The forward arm 96 of signature plate 97 is provided, at its upper edge, with a rack 137 (FIGURES 1, 3 and 9) which meshes with a spur pinion 138 fixed on the forward end of a stub shaft 139 rotatably mounted in the hub portion 93 of the signature plate post 11. Shaft 139 is provided with an element 140 of increased diameter providing a spacer between hub portion 93 and pinion 138. A ball chain sprocket 141 is secured upon stub shaft 139 at the outer face of pinion 138 and receives a bead or or ball chain 142 of known type passed thereabout. The ball chain 142 passes upwardly over an arcuate guide strip 143 mounted on the inner face of the side frame plate 2 and about a second ball chain sprocket 144 fixed on the inner end of a stub shaft 145 rotatably mounted through a bushing 146 secured in plate 2 adjacent the top thereof. A disc 147, shown more clearly in FIGURE 1, is pivoted at 148 to the upper end of a link 149. Disc 147 is held in adjustment by an over center tension spring 147a anchored at one end thereto and at its other end to side frame plate 2. The link 149 is provided, a short distance from its lower end, with a lengthwise slot 150 which receives a stud 151 fixed to side frame plate 2 adjacent the rear thereof. Link 149 is further provided, adjacent its lower end, with a stud 152 projecting through a circular opening 153, somewhat greater in diameter than stud 152, in the upper end of a second link 154. Link 154 is pivoted intermediate its ends on a stud 155 secured to frame plate 2 at the outer face thereof and is pivoted at its lower end, to the rearward end of a link 157. Link 157 is pivoted at its forward end, at 158 to the lower end of an arm 159 fixed at its upper end on the outer end of a shouldered stub shaft 160 rockably mounted through the base 3 of frame plate 2. A stop arm 161 is fixed on the inner end of stub shaft 160 and extends downwardly and forwardly therefrom.

When the signature plate 97 is in inserted position in the machine, the stop arm 161 is in its full line position of FIGURE 1, clear of foot 130 of the counter operating lever 128. During a printing operation the signature plate platen support bar 45 is moved upward effective for releasing the lever 128 which is then turned in counter-clockwise direction by the tension spring 132. That swings arm 125 of the counter 123 downward effective for advancing the counter one number. In the return movement of bar 45 to its normal lower position, after completion of the printing operation, the counter operating lever 128 is returned to its normal position, by stud 131, permitting upward movement of arm 125 of the counter 123 which is thus reset for a subsequent operation. In that manner an accurate count is kept of all checks or check blanks printed while the signature plate is positioned in the machine thus providing a record of all checks or check blanks bearing the printed signature. When it is desired to print checks without a printed signature, the signature plate is withdrawn from the machine. As the signature plate is withdrawn the rack 137 thereof turns ball sprocket 141 in counterclockwise direction, effective for turning disc 147 clockwise from its position shown in FIGURE 1. Such turning movement of disc 147 is effective, through the associated linkage system for turning stop arm 161 clockwise to its broken line position overlying the foot 130 of the counter operating lever 128. The stop arm 161 is then effective for holding lever 128 against movement thereby preventing operation of the counter 123. Accordingly, when the signature plate is removed from the machine the counter will not be actuated incident to a printing operation. When the signature plate is again inserted into the machine, the disc 147 will be turned counter-clockwise to its original position and the counter 123 will be actuated incident to each printing operation in which the signature is printed on a check or a check blank. I thus provide means whereby the counter 123 is actuated when the signature plate is in the machine and it is not actuated when the signature plate is removed from the machine, whereby an accurate record may be kept of the number of checks or check blanks printed and bearing the printed signature.

It will be understood that variations in detail may be resorted to without departing from the field and scope of my invention, and I intend to include all such variations, as fall within the scope of the appended claims, in this application in which the preferred form only of my invention has been disclosed.

I claim:

1. In a check and signature printing machine having means defining a printing line and a plurality of printing members individually adjustable to positions selectively disposing printing characters on the printing line, a signature printing plate insertible into and removable from said machine in advance of and adjacent one end portion of the printing line, platen means cooperable with said plate and printing members, means for moving said platen means toward and away from said printing line and signature plate for effecting a printing operation, means for inking said plate and characters on the printing line incident to a printing operation, and a counter; the improvement comprising means for actuating said counter responsive to a printing operation when said signature plate is mounted in the machine, and means for enabling and disabling said counter actuating means responsive to insertion and removal of said plate.

2. In a check and signature printing machine having means defining a printing line and a plurality of printing members individually adjustable to positions selectively disposing printing characters on the printing line, a signature printing plate support in advance of and adjacent one end portion of the printing line, a signature printing plate insertible onto and removable from said support, platen means underlying and cooperable with said plate and printing members, means for moving said platen means upward and downward toward and away from said printing line and plate for effecting a printing operation, means for inking said plate and characters on the printing line incident to a printing operation, and a counter; the improvement comprising means operated by said platen means and effective for actuating said counter responsive to a printing operation when said plate is mounted on said support, and means for enabling and disabling said counter actuating means responsive to insertion and removal of said plate.

3. In a check and signature printing machine having means defining a printing line and a plurality of printing members individually adjustable to positions selectively disposing printing characters on the printing line, a signature printing plate support in advance of and adjacent one end portion of the printing line, a signature printing plate insertible onto and removable from said support, platen means underlying and cooperable with said plate and printing members, means for moving said platen means upward and downward toward and away from said printing line and plate for effecting a printing operation, means for inking said plate and characters on the printing line incident to a printing operation, and a counter; the improvement comprising means operated by said platen means and effective for actuating said counter responsive to a printing operation, when said plate is mounted on said support, a first shaft rotatably mounted on said support, a gear fixed on said shaft, a second rotatably mounted shaft, a pivoted counter operating lever yieldingly urged in operating direction, a rack on said plate engageable with said gear effective for turning said first shaft in opposite directions responsive to insertion and removal of said plate, a driving connection between said shafts for turning said second shaft with said first shaft, and a stop member actuated by said second shaft movable to a first position releasing said lever for movement in operating direction responsive to insertion of said plate and to a second position holding said lever against movement in operating direction responsive to removal of said plate.

4. In a check and signature printing machine having means defining a printing line and a plurality of printing members individually adjustable to positions selectively disposing printing characters on the printing line, a signature printing plate support in advance of and adjacent one end portion of the printing line, a signature printing plate insertible onto and removable from said support, platen means underlying and cooperable with said plate and printing members, means for moving said platen means upward and downward toward and away from said printing line and plate for effecting a printing operation, means for inking said plate and characters on the printing line incident to a printing operation, and a counter; the improvement comprising means operated by said platen means and effective for actuating said counter responsive to a printing operation when said plate is mounted on said support, a first shaft rotatably mounted on said support, a gear fixed on said shaft, a second rotatably mounted shaft, a pivoted counter operating lever yieldingly urged in operating direction, a stud on said platen means disposed to contact said lever and hold it against movement in the down position of said platen means and to release said lever for movement in operating direction in the upward movement of said platen means, a rack on said plate engageable with said gear effective for turning said first shaft in opposite directions responsive to insertion and removal of said plate, a driving connection between said shafts for turning said second shaft with said first shaft, and a stop member actuated by said second shaft movable to a first position releasing said lever for movement in operating direction responsive to insertion of said plate and to a second position holding said lever against movement in operating direction responsive to removal of said plate.

References Cited by the Examiner

UNITED STATES PATENTS 2,516,920    8/1950    Ryan et al.    235—101 X
3,180,574    4/1965    Morisson    325—101

ROBERT E. PULFREY, *Primary Examiner.*

W. F. McCARTHY, *Assistant Examiner.*